US008065530B2

(12) United States Patent
Willey et al.

(10) Patent No.: US 8,065,530 B2
(45) Date of Patent: Nov. 22, 2011

(54) APPARATUS, AND ASSOCIATED METHOD, FOR PAGING AN ACCESS TERMINAL IN A RADIO COMMUNICATION SYSTEM

(75) Inventors: William Daniel Willey, Gilroy, CA (US); Muhammad Khaledul Islam, Ottawa (CA)

(73) Assignee: Research in Motion Limited, Waterloo (CA)

( * ) Notice: Subject to any disclaimer, the term of this patent is extended or adjusted under 35 U.S.C. 154(b) by 897 days.

(21) Appl. No.: 11/853,198

(22) Filed: Sep. 11, 2007

(65) Prior Publication Data

US 2008/0064417 A1  Mar. 13, 2008

Related U.S. Application Data

(60) Provisional application No. 60/825,197, filed on Sep. 11, 2006.

(51) Int. Cl.
*G06F 11/30* (2006.01)

(52) U.S. Cl. ........ 713/187; 713/193; 455/458; 455/560; 455/561

(58) Field of Classification Search .................. 713/187, 713/193; 455/458, 560, 561
See application file for complete search history.

(56) References Cited

U.S. PATENT DOCUMENTS

| 5,392,287 | A | * | 2/1995 | Tiedemann et al. | 370/311 |
|---|---|---|---|---|---|
| 5,509,015 | A | * | 4/1996 | Tiedemann et al. | 370/311 |
| 6,393,295 | B1 | * | 5/2002 | Butler et al. | 455/458 |
| 7,019,674 | B2 | * | 3/2006 | Cadambi et al. | 341/106 |
| 7,126,948 | B2 | * | 10/2006 | Gooch et al. | 370/392 |
| 7,188,282 | B2 | * | 3/2007 | Walmsley | 714/718 |
| 2002/0184153 | A1 | * | 12/2002 | De Vries | 705/50 |
| 2004/0103291 | A1 | | 5/2004 | Craft et al. | |
| 2005/0089160 | A1 | * | 4/2005 | Crispin et al. | 380/28 |
| 2007/0015523 | A1 | * | 1/2007 | Prakash et al. | 455/458 |

FOREIGN PATENT DOCUMENTS

EP    1004217 B1    6/2005

* cited by examiner

*Primary Examiner* — Nabil El Hady

(57) ABSTRACT

Apparatus, and an associated method for facilitating paging of an access terminal operable in a radio communication system. A plurality of random numbers are generated. And, for each of the random numbers, a hash value is created by applying the random number to a hash function. The hash values identify bit locations of a paging message. When the paging message is formed, bit locations associated with the hash values are populated with bit values that identify whether the access terminal is being paged. And, the access terminal checks the bit values at the bit locations associated with the hash values to determine whether the access terminal is being paged.

18 Claims, 5 Drawing Sheets

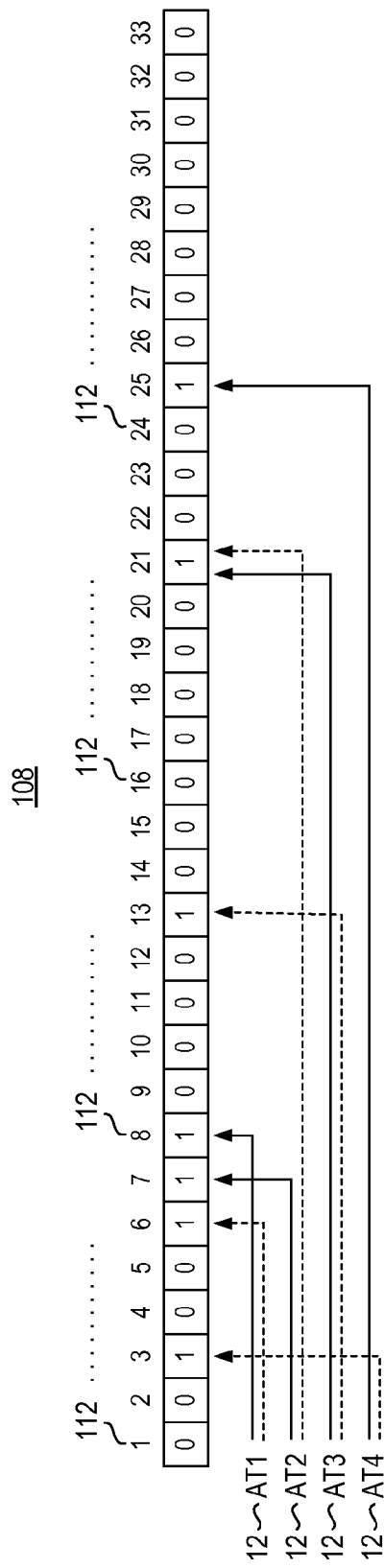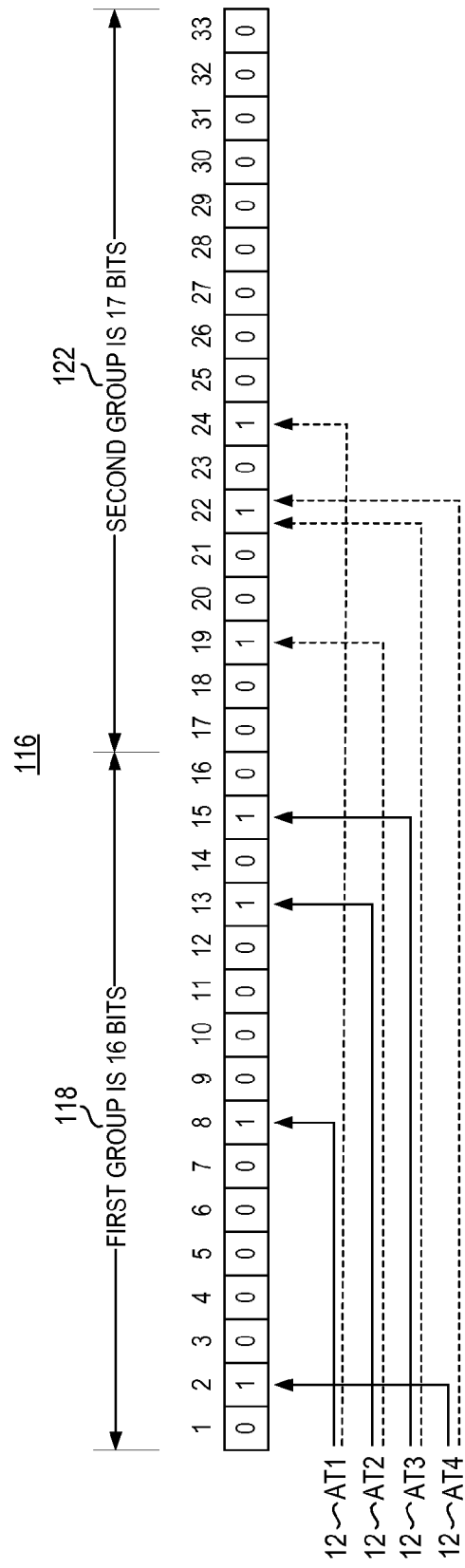

APPARATUS, AND ASSOCIATED METHOD, FOR PAGING AN ACCESS TERMINAL IN A RADIO COMMUNICATION SYSTEM

CROSS REFERENCE TO RELATED APPLICATIONS

The present invention claims the priority of provisional patent application No. 60/825,197, filed on Sep. 11, 2006, the contents of which are incorporated herein by reference.

The present invention relates generally to a manner by which to page an access terminal of a radio communication system to alert the access terminal of a pending call, or other communication. More particularly, the present invention relates to an apparatus, and an associated method, that provides for the generation, sending, and analysis of a quick page message upon a paging channel, such as a QPCH (quick paging channel) defined in an exemplary cellular communication system. The page message is formed in a manner that reduces the likelihood of occurrence of false wakeup of an access terminal. Excessive battery depletion, as a result of false wakeup of the access terminal, is avoided.

BACKGROUND OF THE INVENTION

Advancements in communication technologies have permitted the development and deployment of new types of communication systems and communication services. Cellular telephony, and associated communication services available therethrough, are popularly utilized by many, typically providing users with communication mobility and also providing the capability of communications when the use of wireline communication systems would not be practical or possible.

While early-generation, cellular communication systems provided primarily for voice communications and only limited data communication services, newer-generation systems increasingly provide for high-speed data communication services at variable data communication rates. A CDMA2000, cellular communication system that provides for EV-DO services is an exemplary type of new-generation, cellular communication system that provides for high-speed data services. Operational details and protocols defining communications and operational requirements of devices of the system are set forth in an operating standard specification. Various aspects of operation of the CDMA2000 EV-DO communication scheme remain to be standardized and certain parts of the existing standard specification are considered for amendment. Various successor-generation communication schemes are also undergoing standardization and yet others are envisioned to be standardized.

For instance, a revision to the standard specification, release B of the CDMA2000 EV-DO specification standard defines a quick paging channel (QPCH) available upon which to broadcast access-terminal pages by an access network (AN) to an access terminal (AT). The QPCH was adopted in industry contributions 3GPP2 C20-20060323-013R1 and 3GPP2 C20-20060323-003R1 and published in 3GPP2 document C.S0024-B V1.0. Generally, pages are broadcast by the access network to an access terminal to alert the access terminal of a pending communication. And by so alerting the access terminal, the access terminal performs actions to permit the effectuation of the communication. Page indications broadcast upon the quick paging channel are broadcast in a manner that facilitates reduced battery consumption of the access terminal by reducing the battery consumption of the battery of the access terminal. Increased battery longevity is provided, reducing the rate at which a battery of the access terminal must be recharged. The access terminal is, as a result, able to be operated for a greater period of time between rechargings or battery replacement. The aforementioned promulgations provide for broadcast of a message including page indications upon a physical logical layer that is monitored by the access terminal. The access terminal monitors the QPCH prior to monitoring the control channel to receive regular, control channel MAC (medium access control) messages such as page messages. A quick page message is broadcast upon the QPCH that contains quick page indicators. The quick page message includes a number of quick page indicator slots populated with quick page indicators.

During operation, a mobile station hashes to a quick page indicator location, i.e., slot, within the quick page message based upon a session seed, a 32-bit pseudorandom number. If the quick page indicator of the quick page indicator slot to which the access terminal hashes indicates that the access terminal is not being paged, the access terminal enters into a sleep state, a reduced-power state, in which the access terminal does not remain powered at a level to receive the regular control channel MAC messages. Power savings is particularly significant in the event that the control channel MAC messages are lengthy and span multiple control channel frames or capsules.

In the existing scheme, however, the access terminal is susceptible to the occurrence of a false wakeup, that is, the access terminal does not enter into a sleep state but, rather, the access terminal enters into an active state to monitor the regular control channel for reception of regular control channel MAC messages even though there shall be no message for the access terminal. Because the communication system is a multi-user system, there is a possibility that another access terminal that is being paged has its page indication hashed to the same page indication slot. As the number of access terminals that are paged in a system increases, the likelihood of occurrence of a false wakeup correspondingly increases.

If a manner could be provided by which to reduce the occurrence of false wakeups, improved battery longevity of the access terminal would be possible.

It is in light of this background information related to paging by an access network of an access terminal that the significant improvements of the present invention have evolved.

BRIEF DESCRIPTION OF THE DRAWINGS

FIG. 3 illustrates an exemplary quick page message generated pursuant to operation of an exemplary embodiment of the present invention.

FIG. 4 illustrates an exemplary quick page message generated pursuant to operation of another exemplary embodiment of the present invention.

DETAILED DESCRIPTION

Figure 1:
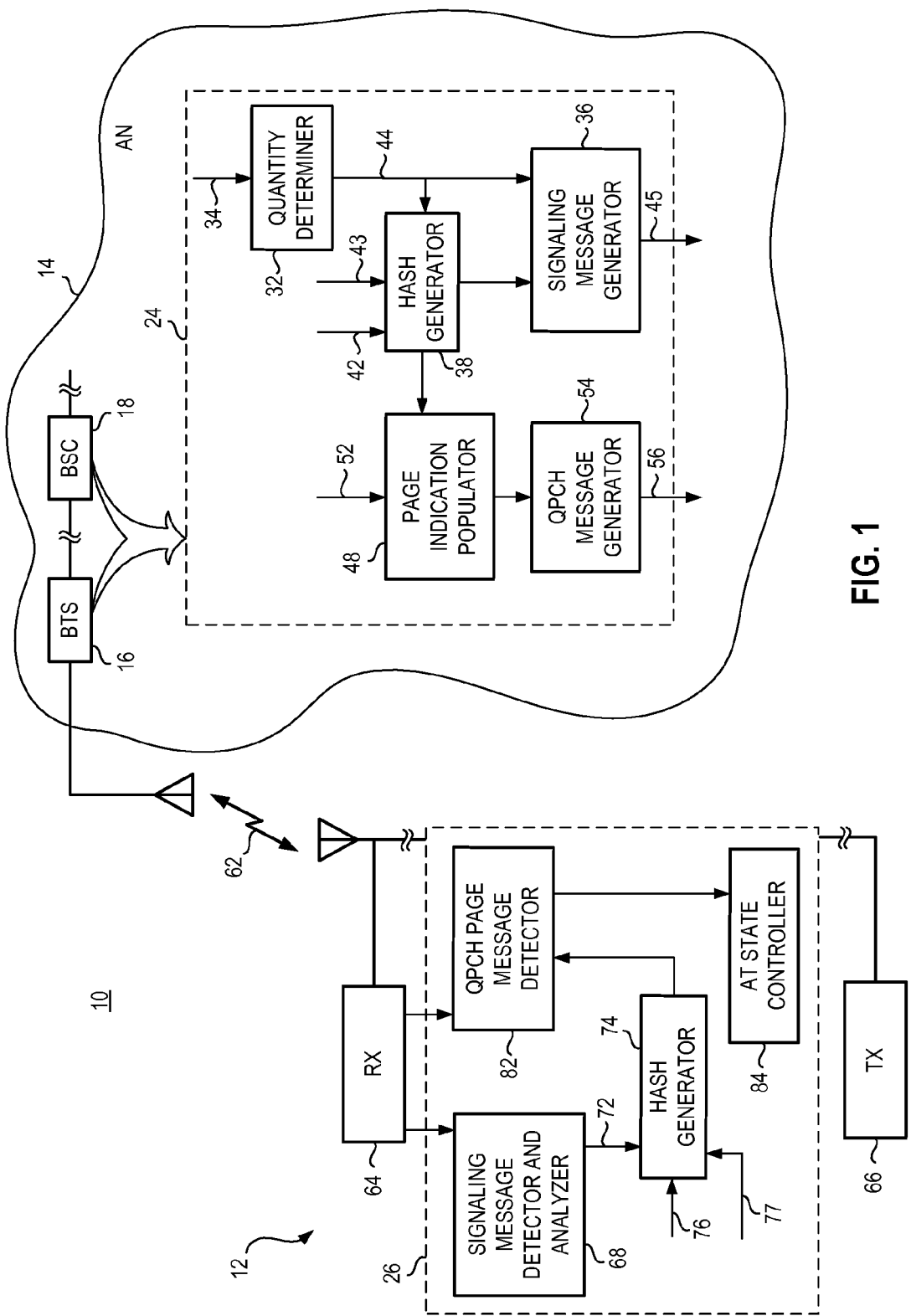
FIG. 1 illustrates a functional block diagram of a radio communication system in which an embodiment of the present invention is operable.

The present invention, accordingly, advantageously provides an apparatus, and an associated method, by which to page an access terminal of a radio communication system to alert the access terminal of a pending call, or other communication.

Through operation of an embodiment of the present invention, a manner is provided to generate, send, and analyze a quick page message, such as a quick page message generated and sent upon a QPCH (Quick Paging Channel) defined in a CDMA2000 EV-DO cellular communication system.

The page message is formed in a manner such that, when analyzed, the access terminal is less susceptible to occurrence of a false wakeup. By reducing the likelihood of occurrence of false wakeup, excessive battery depletion that occurs as a result of false wakeup is less likely to occur.

In one aspect of the present invention, hashing is performed at both an access network and at an access terminal using the same input number, such as a session seed defined in the CDMA2000 EV-DO operating specification standard or other pseudorandom number, or another input number, such as an access terminal identifier (ATI). Hashing is performed upon the input number in the same manner, independently, at the access network and at the access terminal. Multiple hashes are formed by hashing the input number in different manners, e.g., such as by rotating the bit sequence of the input number to create different hash values. Alternately, different hash functions are used to create the different hashes. Formation of the multiple hashes is sometimes referred to herein as multi-hashing. Each hash function operation is carried out in the same manner at the access network and at the access terminal so that the resultant hash values generated at the respective entities are identical. For instance, hashing is first performed at both the access network and at the access terminal upon the input number in non-rotated form. Then, the hashing is performed, again at both the access network and at the access terminal, upon the input number whose bits are rotated by a first number of bits. If additional hashing is performed, the access network and the access terminal both perform the hashing upon the input number, whose bits are further rotated, again in the same manner at the access network and at the access terminal. Bit rotation also decorrelates the hashed values.

In a further aspect of the present invention, the hashing is performed upon the input number by operation of a hash function, or algorithm, upon the input number. The hash function, e.g., is time-varying or otherwise, in some manner, generates hash values that are time-dependent. And, if desired, if multiple hash values are generated, the hash values are further caused to be dissimilar. That is to say, when multiple hash values are generated, a later-generated hash value is caused to be of a value different than any earlier-generated hash value.

In another aspect of the present invention, the access network identifies the number of hashes and the number of page indications that are to be included in a quick page message to page a particular access terminal. A signaling message is generated that includes an indication of the number of hashes or page indications that are going to be broadcast by the access network to a particular access terminal within a paging message. The access terminal, from this signaling message, ascertains the number of page indications that are going to be directed to the access terminal in the quick page message. Responsive to this received number, the access terminal performs hashing upon an input number to form an appropriate number of hash values, and such hash values are used pursuant to analysis of the page message, when received, to identify where in the page message to detect values of page indicators.

In another aspect of the present invention, the number of hashes performed by the access network and, correspondingly, the number of hashes performed at the access terminal, is a selectable number. The number is selected, at least in part, based upon the number of pages that are to be made to other access terminals. And, more generally, the number of hashes is responsive to communication activity in the communication system. When many access terminals are paged, the number of page indications, and hash values, per access terminal is, e.g., a small value. And, conversely, when only a small number of access terminals are to be paged, the number of page indications, and hash values, is, e.g., large. Generally, the number of hash values and resultant page indications per access terminal, populated into a page message for a particular access terminal, is inversely proportional to the communication activity, that is, the number of other pages that are made to other access terminals during a particular period of operation of the communication system. Ideally, the number of page indications and hash values per access terminal is chosen in a way to minimize the probability of false wakeup.

In another aspect of the present invention, the hash values determine where in the page message that the page indications are populated. The hashing performed at the access network and at the access terminal is carried out in the same manners. The page indication locations of a page message in which the page indication values are populated are the same hash values that are generated at the access terminal, and the access terminal detects and analyzes the corresponding page indication locations of the page message, once received at the access terminal.

In another aspect of the present invention, in the event that any of the values of the page indications populating the page indication locations corresponding to the hash values indicate that the access terminal is not being paged, the access terminal enters into a sleep state. For instance, if the access terminal detects any page indication value to which the access terminal hashes and determines the access terminal is not being paged, the access terminal enters into a sleep state. Thereby, the access terminal is more quickly able to enter into a power-saving, sleep mode. Conversely, if the access terminal identifies a page indication value populating a page indication location that indicates that the access terminal is being paged and the access terminal knows that multiple page indications are broadcast to the access terminal in the quick page message, the access terminal monitors for the same page indication value in another page indication location to which the access terminal hashes. If the first positive indication is a false indication, monitoring of a second, or other, page indication locations prior to determining finally that the access terminal is being paged reduces the likelihood of occurrence of false wakeup. Thereby, the access terminal does not enter into an active state to receive a communication responsive to a false wakeup indication. Improved power consumption characteristics of the access terminal result, providing better battery longevity.

In another aspect of the present invention, a hash generator, and an associated hash generation mechanism or hash generation algorithm is provided. The hash values generated by the hash generator ensure, or significantly reduce the possibility, that the hash values, used to hash to locations in a page message for paging of different access terminals, shall be the same value. The occurrence of hash-value "collision" is thereby reduced or eliminated.

In these and other aspects, therefore, apparatus, and an associated methodology, is provided for an access network that selectably generates a first page message on a first paging channel. A page indication populator is configured to populate the first page with a selected number of page indications. A hasher is configured to generate a selected number of hash values. Each hash value is determinative of where the page indicator populates the first page message with a page indication. The hash values selected by the hasher reduce, or eliminate, the possibility of multiple populations of the same location of the page message with multiple hash values.

In these and other aspects, therefore, further apparatus, and an associated methodology, is provided for an access terminal that selectably receives a first page message on a first paging channel. A hasher is configured to generate a selected number of hash values. And, a page indication detector is configured to detect values of page indications populating the first page message. Hash values that are generated are used to identify to the page indication detector where in the first page message to detect the values of the page indications.

Referring first, therefore, to FIG. 1, a radio communication system, shown generally at 10, provides for communications with access terminals, of which the access terminal 12 is exemplary. The communication system forms a multi-user communication system that typically includes a large number of access terminals and a plurality of concurrent communication dialogs. While only a single access terminal is shown in FIG. 1, additional access terminals, analogous to the access terminal 12, typically form a portion of the communication system.

Communications are effectuated between an access terminal and a radio network 14, formed of fixed network infrastructure elements, such as a base transceiver station (BTS) 16 and a base station controller (BSC) 18. The access network encompasses a geographical area within which communications with the access network are possible. That is to say, when an access terminal is positioned within the area encompassed by the access network, the access terminal is generally able to communicate with the access network, and the access network is typically able to communicate with the access terminal.

The communication system is operable in general conformity with the operating protocols and parameters of an appropriate communication specification standard. The description set forth herein is exemplary, and the teachings of various embodiments of the present invention are implementable in any of various types of communication systems.

As previously mentioned, the access terminal is alerted, by broadcast of page messages when a communication, initiated at the network, is to be terminated at the access terminal. A quick paging channel (QPCH), or analogous channel, is defined. Quick page indications, populating a quick page message, are of values that identify whether an access terminal is being paged. However, also as noted previously, particularly during times of heavy usage, a false wakeup of the access terminal might occur due to a quick page indication in the message intended for one access terminal is broadcast within a slot that is also used by another of the access terminals. False wakeup prevents an access terminal from entering into a power-saving sleep mode.

Accordingly, pursuant to an embodiment of the present invention, the access network includes apparatus 24, and the access terminal includes apparatus 26, that operate to reduce the likelihood of the occurrence of false wakeup. The elements of the apparatus 24 and the apparatus 26 are functionally represented, implementable in any desired manner, including, for instance, by algorithms executable by processing circuitry.

The elements forming the apparatus 24 are implemented at any appropriate location of the access network 14, including, as illustrated, at the BTS 16 and BSC 18 or distributed amongst such entities as well as others.

Here, the apparatus 24 includes a quantity of hashes/page indications per access terminal determiner 32. The determiner is coupled to receive, as input indicia, indications of network activity on the line 34. The network activity is quantified, for instance, in a number of page values. The network is aware, e.g., of the number of access terminals that shall be paged. Or, the number of page values comprises, e.g., an expected number of pages, an average number of prior pages, or other paging quantity indicia. Responsive to the indication of the network activity, the determiner determines the number of hashes that are to be generated and the number of page indications that are to be provided pursuant to paging of an access terminal in a quick paging message. In an alternate implementation, the number of hash values is a set number, e.g., a fixed number greater than one. The fixed number of two, e.g., appears to work well when the number of page indication locations in a quick page message is about one hundred eighty. The number of hash values and number of page indications correspond. An indication of the determined quantity is provided to a signaling message generator and to a hash generator, a "hasher", 38.

A number known to both the access network and to the access terminal, such as a session seed or other pseudorandom number, or a number such as an access terminal identifier (ATI) is provided to the hash generator, here represented by way of the line 42. The hash generator hashes the number. That is to say, a hash function is performed upon the number to generate a hash value. Different hash values are provided by, e.g., rotating the number provided to the hash generator and performing the hash function, or algorithm, thereon. Multiple hash values are generated, for instance, by operating upon multiple rotations of the number. With an ideal hash function, all values are equally likely to be generated. An exemplary hash function comprises a mathematical "modulo" operation. A time factor, known to both the access network and the access terminal, such as a system clock time, is, in one embodiment, further provided to, and used by, the hash generator in the formation of hash values. Such factor is represented by line 43 in FIG. 1.

In a further embodiment of the present invention, the hash function forms a hash mechanism that reduces, or eliminates, the possibility that the same hash value shall be selected as a result of multiple hashings. That is to say, in the further embodiment, unique numbers are generated, reducing the amount of "collisions" with, or of, access terminals that are not being paged.

For example, the hash function comprises a so-called Algorithm S (selection sampling technique) taken from Knuth's "The Art of Computer Programming", 3rd Edition, Chapter 3.4.2.

In another implementation, a generate Unique List PI Bits_A algorithm is used in which:
MBA=maximum number of bits available to be set
nPI=number of PI bit locations to select
iPI=number of PI bit locations found so far
jPI=index running through iPI selections
rnd=new random bit to be set. If this is the (jPI+1)st location we need to add jPI to it, since jPI locations are already taken
uListPI[1 . . . nPI]=sorted list of unique indexes of nPI bits to select within MBA;

The algorithm is, e.g., comprises of this pseudo code:

```
generateUniqueListPIBits_A( MBA, nPI ) returning uListPI[ ]
{
    Verify arguments and make sure enough bits are available to be set;
    Select a random across all bits and assign it to the first item in the
    list, e.g.
    uListPI[1] = random(1, MBA);
    Now one by one select random bits from remaining bits, e.g.
    foreach ( iPI = 1→ nPI-1)
    {
        Let rnd = random(1, MBA - iPI), since iPI bits are not available
        Insert the new rnd location (from among available bits) to
        uListPI, e.g.
        foreach ( jPI = iPI → 1)
        {
            Shift indexes in uListPI to insert rnd, so uListPI remains
            sorted e.g.
            if ((rnd + jPI) > uListPI [jPI]) found location so break
            from loop;
            else uListPI [ jPI + 1] = uListPI [ jPI ];
        }
        uListPI [ jPI + 1 ] = rnd + jPI; Note jPI=0 if the loop exited
        without break
    }
    Return uListPI[ ];
}
```

In another implementation, a generate Simple Almost Unique List PI Bits D algorithm is used in which:
MBA=maximum number of bits available to be set
nPI=number of PI bit locations to select
iPI=number of PI bit locations found so far
jPI=index running through iPI selections
rnd=new random bit to be set.
auListPI[1 ... nPI]=list of almost unique indexes of nPI bits to select within MBA;

The algorithm is, e.g., comprised of this pseudo code:

```
generateSimpleAlmostUniqueListPIBits_D( MBA, nPI ) returning
auListPI[ ]
{
    Verify arguments and make sure enough bits are available to be set;
    Select a random across all bits and assign it to the first item in the
    list, e.g.
    auListPI [1] = random(1, MBA);
    Now one by one select random bits from remaining bits, e.g.
    foreach ( iPI = 1→ nPI -1)
    {
        Let rnd = random(1, MBA - iPI), since iPI bits are not available
        Increment rnd by 1 foreach smaller index found so far, e.g.
        foreach ( jPI = 1 → iPI)
        {
            if ((rnd) > auListPI [jPI]) rnd++;
        }
        auListPI [ iPI + 1 ] = rnd;
    }
    Return auListPI[ ];
}
```

In another implementation, a generate Simple Almost Unique List PI Bits K algorithm is used in which:
MBA=maximum number of bits available to be set
nPI=number of PI bit locations to select
jPT=index running through iPI selections
rnd=new random bit to be set.
auListPI[1 ... nPI]=list of almost unique indexes of nPI bits to select within MBA;
vBitsSet[1 ... MBA]=boolean local vector representing bits set so far The algorithm is, e.g., comprised of the pseudo code:

```
generateSimpleAlmostUniqueListPIBits_K(MBA, nPI ) returning
auListPI[ ]
{
    Verify arguments and make sure enough bits are available to be set;
    Set vBitsSet[ ] vector to false;
    Now one by one select random bits checking for single
    collisions, e.g.
    foreach ( jPI = 1→ nPI)
    {
        Select a new random number, e.g.
        Let rnd = random(1, MBA);
        Do a simple single rehash in case of collision, e.g.
        if (vBitsSet[rnd]) rnd = ((rnd+MBA/nPI) mod MBA);
        vBitsSet[rnd] = TRUE;
        auListPI[jPI] = rnd;
    }
Return auListPI[ ];
}
```

The random number generation mentioned in the above, exemplary pseudo codes uses, e.g., existing methods with different keys and/or DECORR values.

The signaling message generator 36 to which the value determined by the determiner 32 is provided generates a signaling message, here generated upon the line 45, that identifies the quantity determined by the determiner. The signaling message is broadcast to the access terminal 12, thereby to alert the access terminal of the determined quantity. The signaling message generator may operate in conjunction with the QPCH generator and include the quantity in the QPCH message. The hash values created by the hash generator 38 are provided to a page indication populator 48. The page indication populator 48 is also provided with a network communication request, here provided by way of the line 52. The page indication populator selects page indication values depending upon whether the access terminal is to be paged. For instance, when an access terminal is to be paged, the page indication values are logical "1" values. In one implementation, all values are initially logical "0" values and then set as appropriate. The page indication values and their associated page indication locations, defined by the hash values generated by the hash generator 38, are provided to a QPCH, or other, message generator 54. The message generator forms a page message 56 that includes a plurality of page indication locations. The page indication populator populates selected page indication locations of the message with the page indication values. The locations populated with a page indication value are determined by the hash values generated by the hash generator 38. In like manner, page indications are formed for other access terminals and hash values are generated to define at where in the page message the page indications intended for other access terminals are populated in the message generated by the message generator 54. When the resultant message 56 is broadcast by the access network, access terminals, such as the access terminal 12, are provided with an indication of whether the access terminal is to be paged.

Transceiver elements of the base transceiver station 16 cause broadcast of the messages generated by the message generator 54 of the apparatus 24 upon a radio air interface, represented in FIG. 1 by the arrow 62. The message is delivered to the access terminal 12 as well as other access terminals within reception range of the broadcast message. The access terminal 12 includes transceiver circuitry, here represented by a receive part 64 and a transmit part 66. The receive part 64 operates to receive signals sent thereto, such as the messages generated by the apparatus 24 of the access network. And, certain of the detected signals are provided to the apparatus

26. Of significance here are detections of the signaling message generated by the signaling message generator of the access network and of the page message generated by the message generator 54.

Indications are provided to a signaling message detector and analyzer 68. The detector and analyzer operate to detect the contents of the signaling message and analyze the detected message to ascertain the number of hashes, or page indications, per access terminal indicated in the message. Indications are provided, here by way of the line 72, to a hash generator 74. The hash generator is also provided with values of the input number, here indicated to be provided by way of the line 76, known to both the access network and access terminal. The time factor, known to both the access network and access terminal is also provided to the generator 74, here represented by way of line 77. The hash generator 74 operates in manners analogous to operation of the hash generator 38 of the access network to perform hash functions upon the input number. And, the input number provided to the hash generator 74 corresponds to the input number provided to the hash generator 38 on the line 42. The number of hash values generated by the hash generator 74 corresponds to the number identified by the detector and analyzer 68. Hash values created by the hash generator 74 are provided to a QPCH (Quick Paging Channel), or other, page message detector 82. The hash values created by the hash generator 74 identify to the page message detector 82 which of the page indication locations that should be monitored to determine whether a page is broadcast to the access terminal. The message broadcast by the access network and detected and operated upon by the access terminal is an atomic message. That is to say, all of the bits are received in a single message. Responsive to detections made by the detector, an indication is provided to an access terminal (AT) state controller 84 to control the state into which the access terminal is placed. And, when the QPCH message indicates that the access terminal is paged, the access terminal begins to monitor a second page channel, for broadcast of a second page message thereon. The receive part of the access terminal also monitors the second page channel. The page indications in the message generated by the message generator 54 are therefore sent pursuant to, i.e., in furtherance of the sending of the second page message on the second page channel.

In the event that the first quick page indication slot monitored by the message detector indicates no page message broadcast to the access terminal, the state controller places the access terminal into a sleep mode. If a first of the quick page indication slots monitored by the detector indicates a page to have been broadcast, but a second of the quick page indication slots monitored by the detector indicates no page, the state controller also causes the access terminal to enter into a low-power, sleep mode. Additional page indications, if more than two, are analogously monitored. The occurrence of a false wakeup is reduced as one or more additional quick page indications are monitored to provide further indication of whether a page has been sent to the access terminal.

Figure 2:
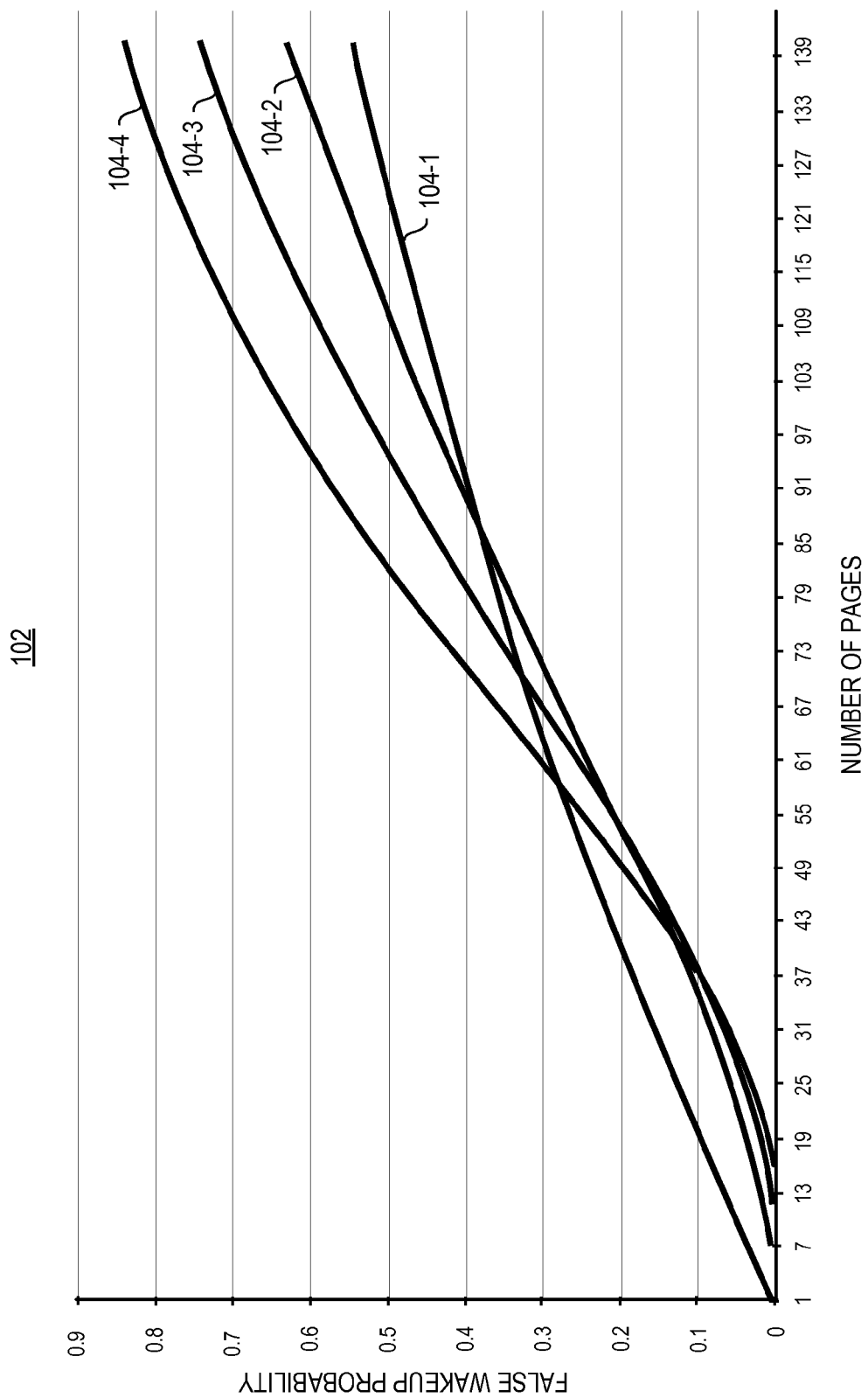
FIG. 2 illustrates a graphical representation of the relationship between the probability of occurrence of a false wakeup as a function of the number of pages in a multi-user communication system for various numbers of hashes.

FIG. 2 illustrates a graphical representation, shown generally at 102, that shows the relationship between the occurrence of false wakeup and the number of pages in the communication system 10 shown in FIG. 1, pursuant to exemplary operation. Plots 104 illustrate the general proportional relationship between the number of pages to access terminals in a multi-user communication scheme and the occurrence of false wakeup, represented in terms of probability. Four plots, plots 104-1, 104-2, 104-3, and 104-4, are shown. The plot 104-1 is representative of the relationship when a single page indication is provided to a particular access terminal in a page message to alert the access terminal of the page. A single hash value is generated, and the page indication is populated in a single page indication location determined by the single hash value. The plot 104-2 is representative of two page indication bits provided in the page message to alert a particular access terminal of the page. Two hash values are generated, and the page indication locations in which the page indications are positioned are determined by the two hash values. The plot 104-3 is representative of use of three page indications in a page message to alert a particular access terminal of the page. Three hash values are generated and their values are determinative of the positioning of the three page indication locations in which the page indications are populated. And, the plot 104-4 is representative of the relationship between false wakeup occurrences when four page indications are used in a page message to page the access terminal.

Review of the plots shows that the number of page indications in a page message that provides the lowest false wakeup probability for a given number of pages in the communication system, i.e., network activity, varies with the number of pages. Pursuant to operation of an embodiment of the present invention, advantage is taken of this relationship in the selection of the number of page indications to use per access terminal. Such selection is made, e.g., by the determiner 32 shown in FIG. 1. Selection is made in such a way as to minimize the false wakeup probability. For each number of pages, i.e., network activity, selection is made of the number of page indications that are to be used to page, in the quick page message, an access terminal. Using, for instance, plots analogous to the plots 104 shown in FIG. 2, the lowest curve for each of the number of pages, i.e., network activity, is selected. Analysis indicates that, when a number of pages is relatively small, the lowest probability of false wakeup occurs when greater number of page indications per access terminal are utilized. Conversely, at higher numbers of pages, i.e., network activity, lesser numbers of page indications provides the lowest false wakeup probabilities. Changeover occurs at various thresholds, indicated in the representation of FIG. 2 when plots cross one another.

Once determination and selection is made at the access network, indication of the selection is provided to an access terminal. The number of page indications, known at both the access network and at the access terminal, permits operation of the apparatus 24 and 26 in coordinated manner. In the exemplary implementation, the page indication values populating a quick page message are all received in the same message. The access terminal need not wake up at different times for separate bits as all of the bits of the message are received at once in the same message. Furthermore, the same page indicator values are hashed instead of, as previously utilized, making divisions into multiple physical groups. And, the page indication locations defined by the hash values are further able to be generated in a manner such that the page indication locations are dissimilar. Rotation of the input number used in the generation of the hash values decorrelates the hash values, and the introduction of time variance in the hash function also provides for hash value dissimilarity.

FIG. 3 illustrates an exemplary quick page message, shown generally at 108. The message is generated, for instance, with respect to the configuration shown in FIG. 1, at the message generator 54. The quick page message includes a plurality, here 33, page indication locations 112, numbered as 1-33. Initially, each page indication location is set to logical "0" values. Page indications for four access terminals 12, identified as AT1, AT2, AT3, and AT4, are represented in the message 108. A hash generator generates hash values of 8 and 6 for the access terminal AT1. And, page indication locations 8 and 6 are populated with values to indicate whether the access terminal AT1 is paged. Here, the logical values "1" are inserted into the page indication locations 8 and 6 that identify that the AT1 is paged. Analogously, with respect to the access terminal AT2, the hash generator generates hash values of 7 and 21, and page indications are inserted into page indication locations 7 and 21 to identify that the access terminal AT2 is paged. Hash values 21 and 13 generated with respect to the access terminal AT3 cause page indication locations 21 and 13 to be populated with page indication bits to identify, here, that the access terminal AT3 is paged. And, hash values generated with respect to the access terminal AT4 of 25 and 3 cause the page indication locations 25 and 3 to be populated with page indication bits, here again to identify that the access terminal AT4 is paged. In this implementation, any of the page indication locations of the message 108 are available to be populated with page indication bits associated with any of the access terminals. And, as indicated at the page indication location 21, a page indication location might include a page indication bit associated with more than one of the access terminals. Ideally, the hash generator generates hash values that permit even, viz. equal, distribution of page indication values across the entire message 108. Each hash for a particular access terminal hashes over the same page indication location in contrast to conventional procedures. And, through use of the time factor, the occurrence of repeated generation of hash values of similar values, and corresponding population of the same page indication locations, for a particular access terminal, is unlikely.

FIG. 4 illustrates another message, here shown generally at 116 that also includes thirty-three page indication locations 112 that are populated with page indication values, here again to page access terminals AT1, AT2, AT3, and AT4. Here, the message is divided into two groups, a first group 118, and a second group 122. Initially, here also, each page indication location is set to logical "0" values. In this implementation, only a single page indication location per group is available for page indicator values associated with a particular access terminal. That is to say, with respect to the access terminal AT1, a single page indication location in the first group is available, and a single page indication location in the second group is available. When a hash value generated by the hash value generator is of a value within the first group, another hash value must be of a value within the second group. Ideally, the hash generator generates hash values that permit even distribution of page indication values across each group of the message. And, as shown in the representation of FIG. 4, a page indication location is available to each of the access terminals in the first group and in the second group. The example shown in FIG. 4 is for an implementation in which two page indication bits are available within the page message per access terminal. If additional page indication bits are available, the page message is divided into additional numbers of groups of substantially equal size, and the page indication locations are correspondingly made available in each of the additional numbers of groups.

Figure 5:
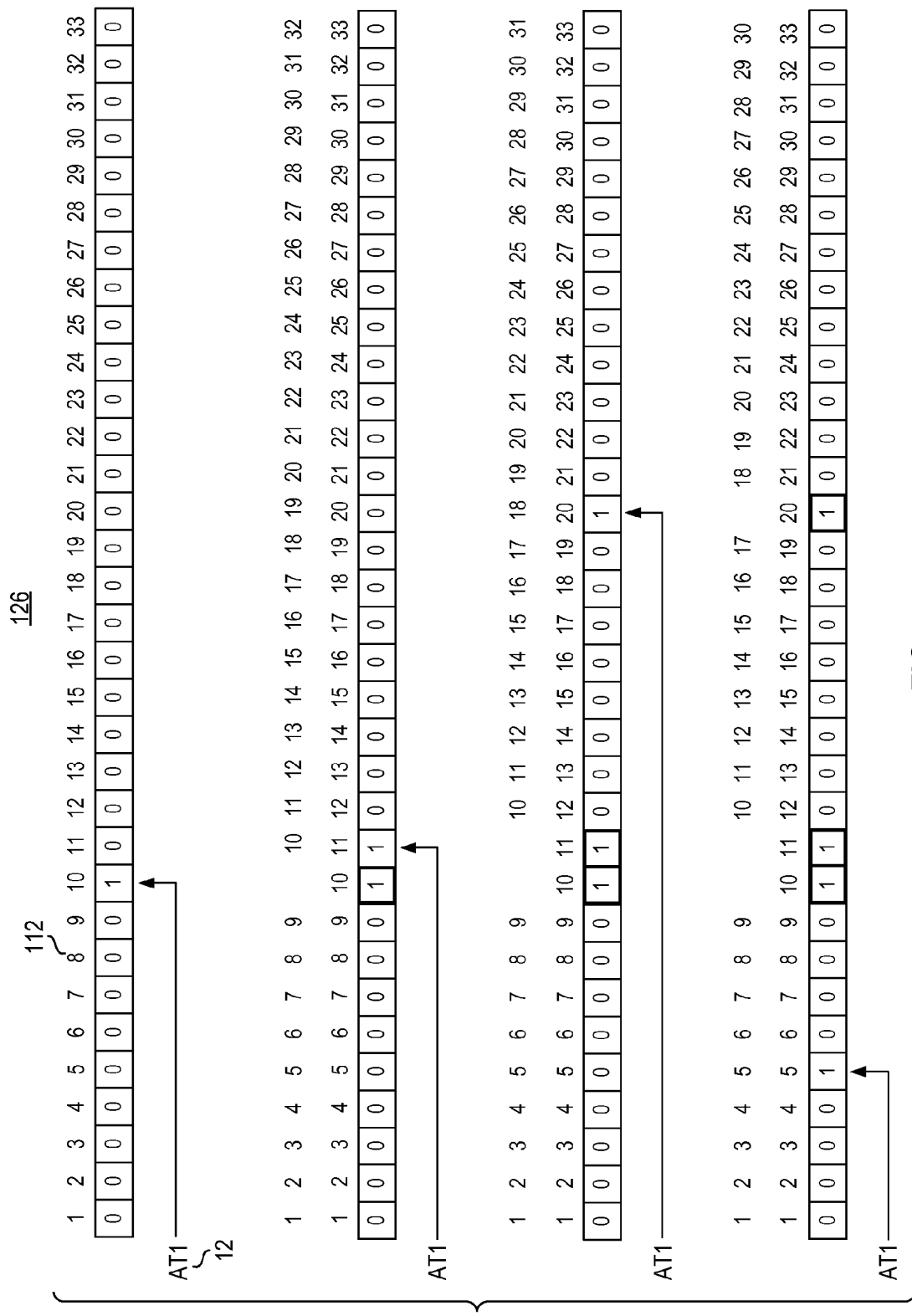
FIG. 5 illustrates formation of an exemplary quick page message pursuant to operation of another exemplary embodiment of the present invention.

FIG. 5 illustrates a quick page message 126 and the manner by which a hash generator operates pursuant to another embodiment. Here, four page indication locations are made available to the access terminal AT1 over the thirty-three bits of the quick page message. And, again, each page indication location is initially set to logical "0" values. When a hash value is selected and the page indication location 112 determined therefrom is used, that page indication location is no longer available to that access terminal at which to populate the message with another page indication value. That is to say, a hash value cannot be repeated for that access terminal. In the representation shown in FIG. 5, a first page indication value is populated in page indication location 10. Here also, ideally, the hash generator generates hash values that permit even distribution of page indications across all of the available page indication locations. As noted below, when a page indication location is used, the location becomes no longer available. Page indication location 10 is no longer available for the access terminal AT1. A next-generated hash value is of 11 and a page indication bit is inserted into the page indication location 11. Thereafter, neither page indication locations 10 nor 11 are available. A subsequently-generated hash value of 20 causes the page indication value to be inserted into page indication location 20. And, thereafter, page indication locations 10, 11, and 20 are no longer available. A fourth-generated hash value of 5 is generated, and the page indication location 5 is populated with a page indication value. In this implementation, use of a time factor is generally not required.

Figure 6:
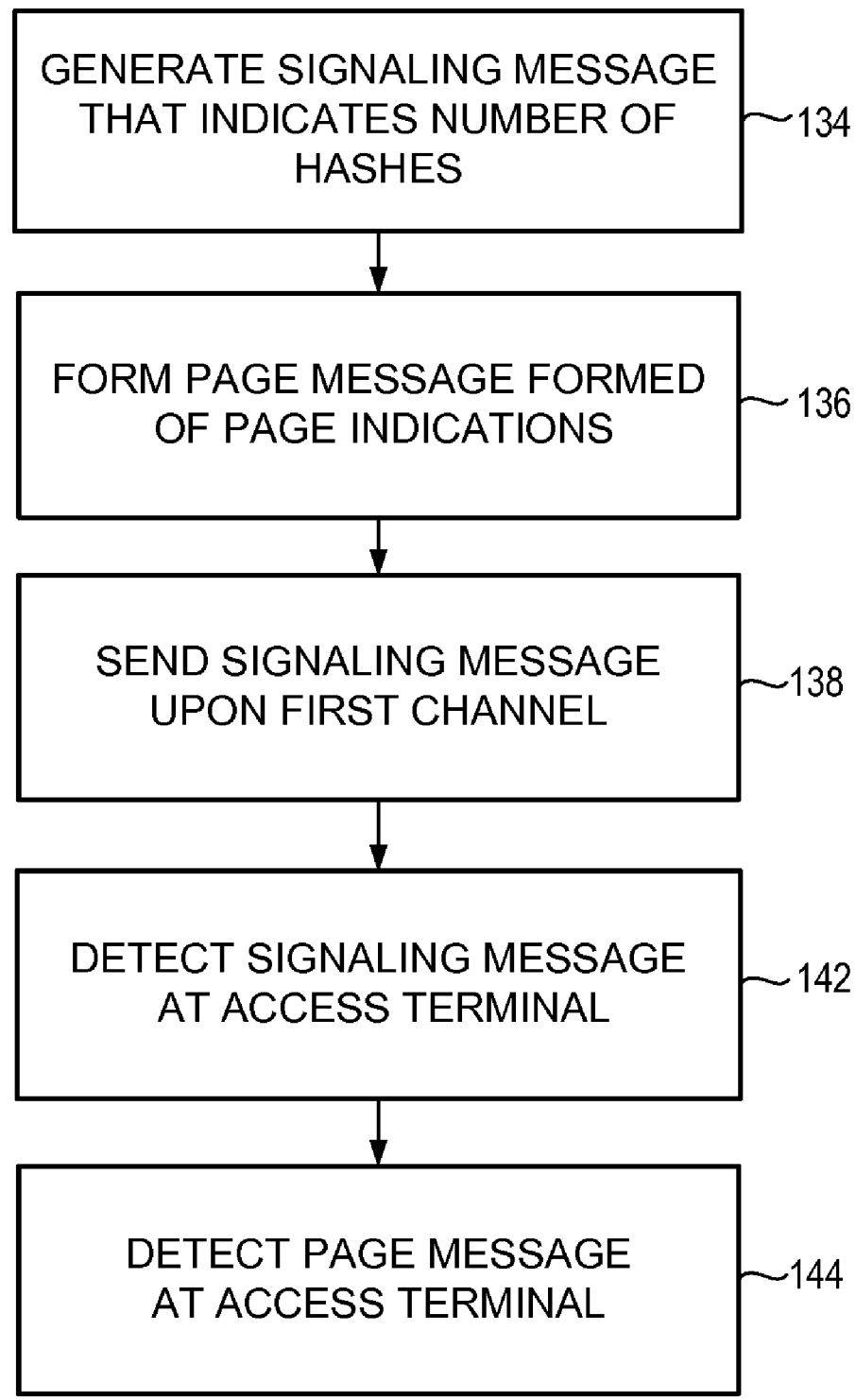
FIG. 6 illustrates a method flow diagram representative of the method of operation of an embodiment of the present invention.

FIG. 6 shows a method flow diagram, shown generally at 132, representative of exemplary operation of an embodiment of the present invention for a communication system that selectably generates page messages on a first channel.

First, and as indicated by block 134, a signaling message is generated that indicates a selected number of hashes to page indications that shall be generated within a page message sent upon the first channel. Then, and as indicated by the block 136, a page message is formed of the page indications corresponding to the selected number of hashes.

As indicated by the block 138, the signaling message is sent upon the first channel. The signaling message is detected, indicated by the block 142, at an access terminal together with the selected number of hashes to quick page indicator slots that are contained in the signaling message. And, as indicated by the block 144, the page message is detected at the access terminal, and a determination is made whether the page message includes the page indications corresponding to the selected number of hashes.

Thereby, through operation of an embodiment of the present invention, an access terminal is able better, and quickly, to determine whether a page is broadcast thereto. If a quick page message, page indication location to which the access terminal hashes fails to include an indication that the access terminal is being paged, the access terminal enters into a reduced power state. The occurrence of false wakeup is less likely to occur due to the multi-hashing to the multiple quick paging indication slots.

Presently preferred embodiments of the invention and many of its improvements and advantages have been described with a degree of particularity. The description is of preferred examples of implementing the invention, and the description of preferred examples is not necessarily intended to limit the scope of the invention. The scope of the invention is defined by the following claims.

What is claimed:

1. A method for generating hash values used pursuant to communication of a paging message, said method comprising:

generating a first hash value at a hash generator using a first decorrelate (DECORR) value, wherein the first DECORR value is a first multiple of an input number, wherein the input number comprises at least a portion of a session seed known to both an access network and an access terminal;

generating a second hash value at the hash generator using a second DECORR value, wherein the second DECORR value is a second multiple of the input number; and using the first hash value and the second hash value to determine a first page indication location and a second page indication location, respectively, for a page in the paging message.

2. The method of claim 1 wherein the input number comprises a group of significant bits of the session seed.

3. The method of claim 1, further comprising:
rotating the input number a first number of bits after generating the first hash value.

4. The method of claim 3 wherein the input number comprises a multi-bit binary number and wherein said rotating comprises multiplying the multi-bit binary number.

5. The method of claim 1 wherein the first hash value and the second hash value are dissimilar.

6. The method of claim 1 wherein said generating the first hash value and said generating the second hash value are performed using a common hash function.

7. The method of claim 1 wherein the paging message comprises a received paging message received at an access terminal and wherein generating the first hash value, generating the second hash value, and said using are performed at the access terminal.

8. The method of claim 1 wherein the paging message comprises a send-paging message formed at a network entity and wherein generating the first hash value, generating the second hash value, and said using are performed at the network entity.

9. The method of claim 1 further comprising generating a signaling message that includes indication of configuration of the paging message.

10. The method of claim 1 further comprising configuring the paging message to be an atomic message.

11. The method of claim 1 further comprising:
generating a third hash value using a third DECORR value, wherein the third DECORR value is a third multiple of the input number; and
using the third hash value to determine a third page indication location for the page in the paging message.

12. A method for generating hash values used pursuant to communication of a paging message, said method comprising:
generating a first hash value at a hash generator using a first decorrelate (DECORR) value, wherein the first DECORR value is a first multiple of an input number, wherein the input number comprises at least a portion of a session seed known to both an access network and an access terminal;
using the first hash value to determine a first page indication location for a page in the paging message, the first page indication location being in a first group of bits of the paging message;
generating a second hash value at the hash generator using a second DECORR value, wherein the second DECORR value is a second multiple of the input number;
using the second hash value to determine a second page indication location for the page in the paging message, the second page indication location being in a second group of bits of the paging message, the second group of bits being different from the first group of bits;
generating a third hash value at the hash generator using a third DECORR value, wherein the third DECORR value is a third multiple of the input number;
using the third hash value to determine a third page indication location for the page in the paging message, the third page indication location being in a third group of bits of the paging message, the third group of bits being different from the first group of bits and different from the second group of bits;
generating a fourth hash value at the hash generator using a fourth DECORR value, wherein the fourth DECORR value is a fourth multiple of the input number; and
using the fourth hash value to determine a fourth page indication location for the page in the paging message, the fourth page indication location being in a fourth group of bits of the paging message, the fourth group of bits being different from the first group of bits, different from the second group of bits, and different from the third group of bits.

13. An apparatus in an access network, said apparatus comprising:
processing circuitry configured to execute algorithms which when executed cause the processing circuitry to implement:
a hash generator configured to generate a first hash value using a first decorrelate (DECORR) value, wherein the first DECORR value is a first multiple of an input number and to generate a second hash value using a second DECORR value, wherein the second DECORR value is a second multiple of the input number, wherein the input number comprises at least a portion of a session seed known to both the access network and an access terminal; and
a paging message element that receives the first hash value and the second hash value, said paging message element configured to utilize the first hash value to determine a first page indication location for a page in a paging message, and configured to utilize the second hash value to determine a second page indication location for the page in the paging message.

14. The apparatus of claim 13 wherein the input number comprises a group of bits of the session seed.

15. The apparatus of claim 13 wherein the input number comprises a multi-bit binary number.

16. The apparatus of claim 13 wherein said paging message element comprises a network-positioned element.

17. The apparatus of claim 13 wherein said paging message element comprises an access-terminal positioned element.

18. The apparatus of claim 13 further comprising a signaling message generator configured to generate a signaling message that includes indication of configuration of the paging message.

* * * * *